(12) United States Patent
Weber et al.

(10) Patent No.: US 11,978,928 B2
(45) Date of Patent: May 7, 2024

(54) PLANT FOR RECYCLING USED BATTERIES

(71) Applicant: BHS-Sonthofen GmbH, Sonthofen (DE)

(72) Inventors: Daniel Weber, Immenstadt (DE); Christopher Drechsel, Sonthofen (DE)

(73) Assignee: BHS-Sonthofen GmbH, Sonthofen (DE)

( * ) Notice: Subject to any disclaimer, the term of this patent is extended or adjusted under 35 U.S.C. 154(b) by 533 days.

(21) Appl. No.: 17/286,085

(22) PCT Filed: Oct. 2, 2019

(86) PCT No.: PCT/EP2019/076689
§ 371 (c)(1),
(2) Date: Apr. 16, 2021

(87) PCT Pub. No.: WO2020/078722
PCT Pub. Date: Apr. 23, 2020

(65) Prior Publication Data
US 2021/0359312 A1     Nov. 18, 2021

(30) Foreign Application Priority Data
Oct. 18, 2018 (EP) .................................. 18201348

(51) Int. Cl.
*H01M 6/52* (2006.01)
*B03B 9/06* (2006.01)
(Continued)

(52) U.S. Cl.
CPC ............... *H01M 6/52* (2013.01); *B03B 9/061* (2013.01); *F26B 3/00* (2013.01); *F26B 5/04* (2013.01);
(Continued)

(58) Field of Classification Search
CPC ... F26B 3/00; F26B 5/04; H01M 6/52; H01M 10/54; B03B 2009/066
(Continued)

(56) References Cited

U.S. PATENT DOCUMENTS 4,401,463 A * 8/1983 Melin ..................... C22B 1/005
                                                  75/669
5,612,150 A * 3/1997 Nishimura ............ H01M 10/54
                                                  429/49
(Continued)

FOREIGN PATENT DOCUMENTS

CA        2983768 A1 * 11/2016 ............. B02C 21/00
CN        103959553 A     7/2014
(Continued)

OTHER PUBLICATIONS

European Application No. EP18201348.2, Extended European Search Report, dated Apr. 30, 2019, 6 pages.
(Continued)

*Primary Examiner* — Stephen M Gravini
(74) *Attorney, Agent, or Firm* — Kilpatrick Townsend & Stockton LLP

(57) ABSTRACT

The invention relates to a plant for recycling used batteries, comprising a comminuting device to comminute used batteries in a comminuting space. The plant includes a drying device, arranged downstream of the comminuting device, to dry the comminuted batteries. The plant includes an intermediate storage device arranged between the comminuting device and the drying device. The plant includes a stirring means to keep the comminuted batteries received in the intermediate storage space in motion. The plant includes a respective supply line for inert gas for each of the comminuting space of the comminuting device, the intermediate
(Continued)

storage space of the intermediate storage device, and a drying space of the drying device.

19 Claims, 1 Drawing Sheet

(51) Int. Cl.
    *F26B 3/00*     (2006.01)
    *F26B 5/04*     (2006.01)
    *H01M 10/54*     (2006.01)

(52) U.S. Cl.
    CPC ....... *H01M 10/54* (2013.01); *B03B 2009/066* (2013.01)

(58) Field of Classification Search
    USPC .............................................................. 34/90
    See application file for complete search history.

(56) References Cited

U.S. PATENT DOCUMENTS

| | | | | |
|---|---|---|---|---|
| 5,632,863 | A * | 5/1997 | Meador | C10B 53/00 |
| | | | | 201/3 |
| 6,447,669 | B1 * | 9/2002 | Lain | H01M 6/52 |
| | | | | 429/49 |
| 8,974,754 | B2 * | 3/2015 | Kikuta | H01M 10/54 |
| | | | | 423/140 |
| 11,050,097 | B2 * | 6/2021 | Hanisch | B02C 23/20 |
| 2009/0314134 | A1 | 12/2009 | Iida | |
| 2014/0290438 | A1 | 10/2014 | Hanisch et al. | |
| 2015/0080630 | A1 * | 3/2015 | Dunagan | B01D 53/1425 |
| | | | | 588/318 |
| 2018/0301769 | A1 | 10/2018 | Hanisch et al. | |
| 2021/0359312 | A1 * | 11/2021 | Weber | F26B 3/00 |
| 2022/0021042 | A1 * | 1/2022 | Tiberio | H01M 6/52 |
| 2022/0056553 | A1 * | 2/2022 | Hupka | H01M 10/54 |
| 2023/0083016 | A1 * | 3/2023 | Yodose | B07B 7/01 |
| | | | | 241/24.25 |
| 2023/0138120 | A1 * | 5/2023 | Miyanaga | C22B 1/005 |
| | | | | 75/743 |

FOREIGN PATENT DOCUMENTS

| | | | | |
|---|---|---|---|---|
| CN | 105826629 | A | 8/2016 | |
| CN | 105846004 | A | 8/2016 | |
| CN | 105914419 | A | 8/2016 | |
| CN | 108281729 | A | 7/2018 | |
| DE | 102011110083 | A1 | 2/2013 | |
| DE | 102012024876 | A1 | 6/2014 | |
| DE | 102015207843 | A1 | 11/2016 | |
| EP | 2508271 | A2 | 10/2012 | |
| EP | 3641036 | A1 * | 4/2020 | ............. B03B 9/061 |
| IT | 201800007426 | A1 * | 1/2020 | |
| WO | 2005015668 | A1 | 2/2005 | |
| WO | WO-2016174156 | A1 * | 11/2016 | ............. B02C 21/00 |
| WO | WO-2020021365 | A1 * | 1/2020 | ............. C22B 1/005 |
| WO | WO-2020078722 | A1 * | 4/2020 | ............. B03B 9/061 |

OTHER PUBLICATIONS

International Application No. PCT/EP2019/076689, International Search Report and Written Opinion, dated Dec. 20, 2019, 12 pages.
Chinese Application No. 201980067570.3, Office Action mailed Feb. 2, 2024, 8 pages.

* cited by examiner

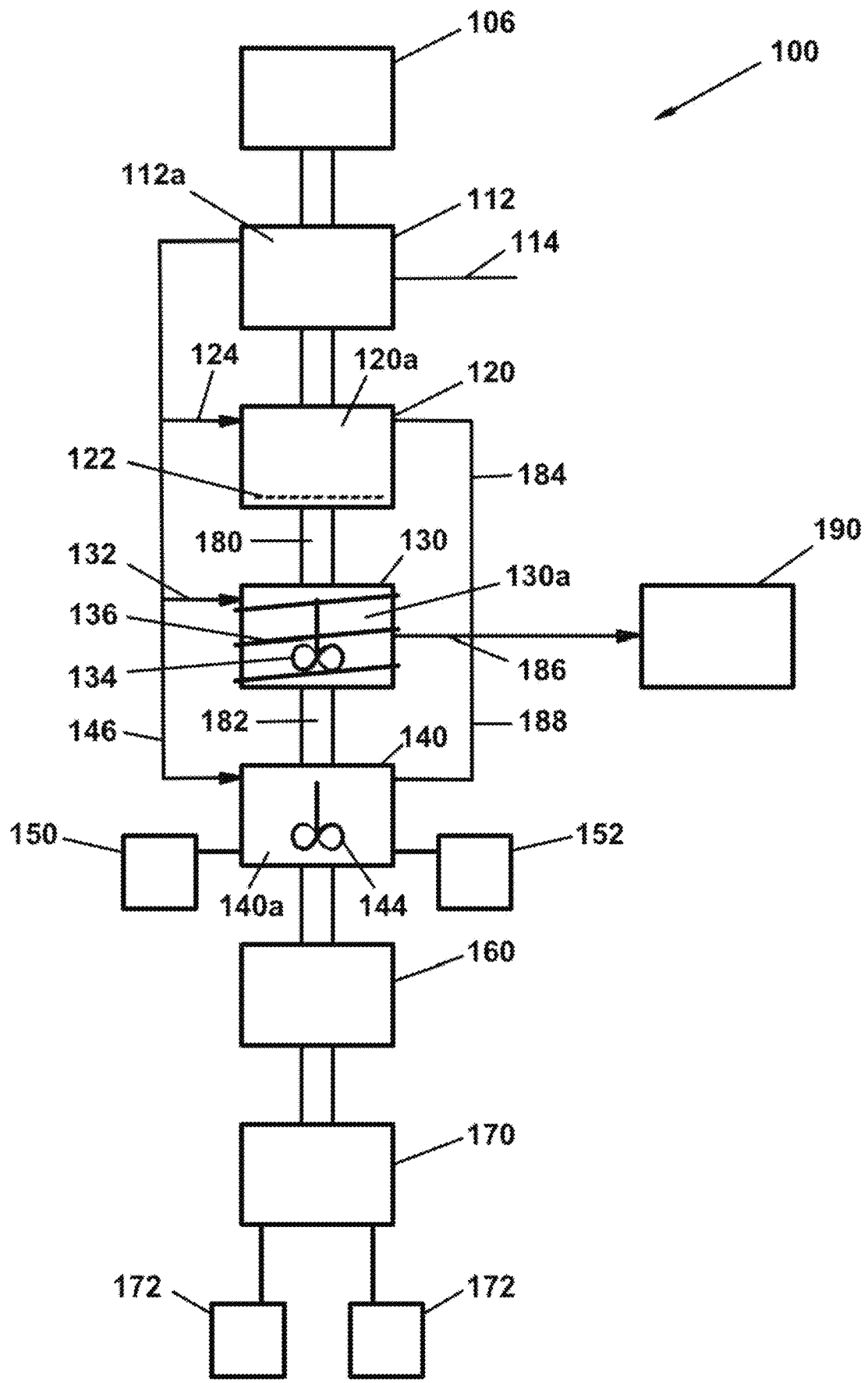

PLANT FOR RECYCLING USED BATTERIES

CROSS REFERENCE TO RELATED APPLICATION

This application is a U.S. national phase of International Patent Application No. PCT/EP2019/076689 filed on Oct. 2, 2019, which claims priority to European Patent Application No. 18201348.2, filed in Europe on Oct. 18, 2018. The entire contents of both applications are hereby incorporated herein by this reference.

The invention relates to a plant for recycling used batteries, comprising a comminuting device, which is designed and intended to comminute the used batteries in a comminuting space, and a drying device, arranged downstream of the comminuting device, which is designed and intended to dry the comminuted batteries.

In connection with the present invention, the term "battery" is understood to mean not only batteries in the actual sense, i.e. non-rechargeable primary cells, but also accumulators, i.e. rechargeable energy storage cells. In particular, the device according to the invention is suitable for processing rechargeable and non-rechargeable storage cells which are constructed using lithium, i.e. in particular lithium compounds and/or lithium ions, and are referred to very generally in the present application as "lithium batteries".

Furthermore, in connection with the present invention, the term "drying" is understood very generally to mean the removal, in particular evaporation, of the electrolyte, for example dimethyl carbonate (DMC) and/or ethyl methyl carbonate (EMC). Although it does not necessarily have to relate to liquid substances, but can also relate to solids, the term "drying" has become common in technical language for this purpose.

The recycling of batteries, in particular the recycling of lithium batteries, is not entirely unproblematic, since the electrochemical materials used in the batteries have a high risk of self-ignition and sometimes even a risk of explosion.

In the plant known from the generic DE 10 2015 207 843 A1, the batteries are therefore prepared in a complex manner, in particular discharged and dismantled, before they are comminuted and dried. This increases the operating costs of the known device, in particular because of the labour required.

The object of the present invention is therefore to provide a plant of the type mentioned at the outset which can be operated more economically.

This object is achieved by a plant of the type mentioned at the outset, which is characterised in that an intermediate storage device is arranged between the comminuting device and the drying device, the volume of an intermediate storage space of the intermediate storage device being at least five times, preferably at least ten times, the volume of the comminuting space of the comminuting device, in that the intermediate storage device further comprises a stirring means which is designed and intended to keep the comminuted batteries received in the intermediate storage space in motion, and in that the comminuting space of the comminuting device and the intermediate storage space of the intermediate storage device and a drying space of the drying device each have a supply line for inert gas.

The intermediate storage device assumes multiple functions in the plant according to the invention.

Firstly, the intermediate storage gives the electrochemical reactions taking place in the comminuted material time to decay to such an extent that they no longer pose a problem when the comminuted material is supplied to the drying device.

In addition, the intermediate storage device serves as a temporary store for comminuted material. In this way, the plant according to the invention can be operated in a batch-wise manner, such that only such a small amount of used batteries needs to be supplied to the comminuting device in each batch, while a larger amount of comminuted material can be supplied to the drying device at once. Due to the small amount of material to be comminuted in one step, the risk of self-ignition can be practically excluded. This is particularly advantageous because the used batteries in the plant according to the invention are supplied to the comminuting device in a non-pre-discharged or at least not completely pre-discharged state, and the residual charge state of the batteries, which drives the electrochemical reactions, is unknown.

And finally, comminuted batteries recently brought into the intermediate storage space by the comminuting device are mixed there, by means of the stirring means, with comminuted material that was previously brought into the intermediate storage space, in which material the electrochemical reactions have at least partially subsided. This can avoid the formation of partial volumes of impermissibly high temperature, from which there is an increased risk of self-ignition.

In order to be able to further reduce the risk of self-ignition, inert gas is additionally supplied to the comminuting device and the intermediate storage device and the drying device, i.e. a gas that at least counteracts, if not even prevents, self-ignition of the comminuted batteries while the electrochemical reactions are taking place. For example, nitrogen gas and/or carbon dioxide gas can be used as the inert gas.

All of these measures ensure that in the plant according to the invention, substantially unprepared batteries, in particular batteries that are not or at least not completely pre-discharged and dismantled, can be recycled in a substantially automated and therefore cost-effective process.

According to the invention, 1 t of used batteries per hour, for example, can be recycled in the plant according to the invention, which batteries are supplied to the comminuting device in the form of ten batches of 100 kg and temporarily stored in the intermediate storage device before they are passed onto the drying device. For this purpose, the comminuting device can have a comminuting space of, for example, approximately 0.5 m$^3$ volume and/or the intermediate storage device can have an intermediate storage space of, for example, approximately 6.0 m$^3$ volume and/or the drying device can have a drying space of, for example, approximately 3.0 m$^3$ volume. In the case of the last-mentioned specification, it must be taken into account that the comminuted material is compacted by the conveying device, for example a pipe screw conveyor, which transports the material from the homogenising device to the drying device.

In order to be able to prevent environmentally incompatible or even dangerous gases from escaping from the battery recycling plant, it is proposed in a further development of the invention that the comminuting space and/or the intermediate storage space and/or the drying space are gas-tight.

Advantageously, it is also possible that the transfer device for transferring the comminuted batteries from the comminuting device to the intermediate storage device and/or the transfer device for transferring the comminuted batteries from the intermediate storage device to the drying device is gas-tight and connected to the devices adjoining same in a gas-tight manner.

It is also possible that an exhaust gas treatment device is provided which is connected to the comminuting space and/or the intermediate storage space and/or the drying space via gas supply lines and is designed and intended to process the gases formed in the comminuting space and/or in the intermediate storage space and/or in the drying space. A person skilled in the art is familiar with the components that the exhaust gas treatment device can or should comprise depending on the gas components produced. For this reason, a detailed discussion of the design and function of the exhaust gas treatment device should be dispensed with at this point.

In order to be able to further reduce the risk from the recycling plant, it is proposed that a deep-freezing device is arranged upstream of the comminuting device, which deep-freezing device comprises a feed line for liquid deep-freezing medium and which is designed and intended to deep-freeze the used batteries in the liquid deep-freezing medium before they are comminuted in the comminuting device.

Liquefied inert gas, for example, in particular liquid nitrogen and/or liquid carbon dioxide, can be used as the liquid deep-freezing medium. In this case, a gas head space of the deep-freezing device can also be connected to the supply line for inert gas. In this way, the deep-freezing medium evaporating due to the energy input from the used batteries can be used as an inert gas in the comminuting device and/or in the intermediate storage device and/or in the drying device.

In order to be able to prevent excessively large fragments of the comminuted batteries from being able to leave the comminuting device in the direction of the intermediate storage device, it is proposed that a sieve unit, for example a perforated sieve, is arranged at the outlet of the comminuting device. The sieve unit can, for example, have openings having a diameter of 20 mm. For example, a universal shredder of the type NGU 0513, as sold by the applicant, can be used as the comminuting device.

In order to be able to ensure that the temperature in the intermediate storage space does not exceed a critical temperature value, for example 120° C., it is also possible that the intermediate storage device is assigned a cooling device. This cooling device can be designed, for example, in the form of cooling tubes which are attached to a wall surrounding the intermediate storage space, are in heat-exchange contact with the wall and through which, if necessary, cooling medium can flow.

In a further development of the invention, it is proposed that the drying device is designed as a negative-pressure drying device and has a pressure control unit which is designed and intended to set and maintain the pressure in the drying space at a value of approximately 50 hPa below the ambient pressure. In order to be able to dry effectively at the same time, it is further proposed that the drying device further has a temperature control unit which is designed and intended to set and maintain the temperature in the drying space at a value of between approximately 100° C. and approximately 120° C.

In order to be able to supply the comminuted and dried batteries for further processing, a filling device can be arranged downstream of the comminuting device. In this filling device, the comminuted and dried batteries can be filled into transport containers, for example.

However, it is also conceivable that at least one screening device, preferably arranged upstream of the filling device, is arranged downstream of the comminuting device. In this screening device, the individual components of the comminuted and dried batteries can be separated from one another and thus supplied to a more targeted processing.

The invention will be explained in more detail below on the basis of an embodiment with reference to the accompanying drawing, in which:

FIG. 1 is a roughly schematic sketch of the design of the plant according to the invention for recycling batteries.

In FIG. 1, a plant according to the invention for recycling used batteries is very generally denoted by the reference sign 100. The plant 100 comprises a comminuting device 120, an intermediate storage device 130 and a drying device 140.

The plant 100 is designed for batch-wise operation. In other words, a predetermined amount of used batteries, for example 100 kg of used lithium batteries, is supplied to the comminuting device 120 by an upstream dosing device 106, which is used to divide the delivered used batteries into individual portions of the predetermined amount.

If desired, a deep-freezing device 112, indicated by dashed lines in FIG. 1, can also be provided between the dosing device 106 and the comminuting device 120, in which the batteries to be comminuted are frozen in liquefied inert gas, for example liquid nitrogen and/or liquid carbon dioxide, before they are supplied to the comminuting device 120. The liquefied inert gas can be supplied to the deep-freezing device via a feed line 114.

For example, the comminuting device 120 can be formed by a universal shredder of the type NGU 0513, as sold by the applicant. On the outlet side, the comminuting device 120 can be equipped with a sieve device 122, for example a perforated plate, the holes of which have a diameter of approximately 20 mm. In order to prevent environmentally incompatible gases from escaping from the comminuting device 120, said device is preferably gas-tight. In addition, the comminuting device 120 can be equipped with a supply line 124 for inert gas, via which inert gas can be supplied to the comminuting space 120a of the comminuting device 120, which reduces, if not completely excludes, the risk of self-ignition of the comminuted batteries. If a deep-freezing device 112 of the type described above is provided, the inert gas can be removed from its head space 112a and supplied to the comminuting device 120.

After a predetermined residence time in the comminuting device 120, the comminuted batteries are conveyed to the intermediate storage device 130. This intermediate storage device is also preferably gas-tight. In addition, inert gas can also be supplied to the intermediate storage device 130 via a feed line 132 in order to be able to reduce, if not completely exclude, the risk of self-ignition of the comminuted batteries. The intermediate storage device 130 also has a stirring means 134 which constantly mixes the batteries received and comminuted in the intermediate storage space 130a in order to prevent the formation of partial volumes of excessive temperature. In the event that the temperature in the intermediate storage space 130a rises too much, the intermediate storage device 130 also has a cooling device 136, for example cooling coils through which cooling medium flows, which are attached to the outer boundary wall of the intermediate storage space 130a and are in heat-exchange contact therewith.

If the comminuted batteries from a predetermined number of comminution processes were received in the intermediate storage device 130, the intermediate storage space 130a is emptied in the direction of the drying device 140, the drying space 140*a* of which is preferably also gas-tight and which can also have a stirring means 144. Furthermore, inert gas can also be supplied to the drying space 140*a* via a line 146. In the embodiment shown, the drying device 140 is designed as a negative-pressure drying device which dries the comminuted batteries at a pressure of 50 hPa below the ambient pressure and a temperature of at least 120° C. The pressure control unit and temperature control unit required for this purpose are denoted by reference signs 150 and 152 in FIG. 1.

A screening device 160 of a design known per se and therefore not explained in detail here can be arranged downstream of the drying device 140, in which screening device the individual components of the comminuted and dried batteries can be separated from one another and thus supplied to a more targeted processing. In principle, it is conceivable to arrange a plurality of screening stages one behind the other, it being possible for one of the screening stages to comprise a simple sieve.

Finally, the batteries that have been comminuted, dried and optionally separated according to components can be filled into transport containers 172 in a filling device 170.

It should also be added that not only the comminuting device 120, the intermediate storage device 130 and the drying device 140 can be made gas-tight, but so can the transfer devices 180 and 182, which transfer the comminuted batteries from the comminuting device 120 to the intermediate storage device 140 or from the intermediate storage device 130 to the drying device 140.

It should also be added that the potentially environmentally hazardous gases formed in the comminuting device 120, the intermediate storage device 130 and the drying device 140 can be supplied via lines 184, 186, 188 to an exhaust gas treatment device 190 of a known type, in which they are processed in an environmentally friendly manner.

Finally, it should also be added that all of the above-mentioned devices of the battery recycling plant 100 can be designed so as to have associated inlet and/or outlet double gate locks (not shown in FIG. 1).

The invention claimed is:

1. A plant for recycling used batteries, comprising:
a comminuting device to comminute used batteries in a comminuting space;
a drying device, arranged downstream of the comminuting device, to dry the comminuted batteries;
an intermediate storage device arranged between the comminuting device and the drying device and comprising an intermediate storage space for receiving the comminuted batteries;
a stirring means to keep the comminuted batteries received in the intermediate storage space in motion; and
at least one supply line for supplying inert gas to each of the comminuting space of the comminuting device, the intermediate storage space of the intermediate storage device, and a drying space of the drying device.

2. The plant of claim 1, wherein one or more of the comminuting space, the intermediate storage space, or the drying space are gas-tight.

3. The plant of claim 1, wherein one or more of a transfer device for transferring the comminuted batteries from the comminuting device to the intermediate storage device or a transfer device for transferring the comminuted batteries from the intermediate storage device to the drying device is gas-tight and connected to adjoining devices in a gas-tight manner.

4. The plant of claim 1, further comprising an exhaust gas treatment device connected to one or more of the comminuting space, the intermediate storage space, or the drying space via gas supply lines and processes gases formed in one or more of the comminuting space, the intermediate storage space, or in the drying space.

5. The plant of claim 1, further comprising a deep-freezing device arranged upstream of the comminuting device, the deep-freezing device comprising a feed line for a liquid deep-freezing medium, wherein the deep-freezing device is configured to deep-freeze the used batteries in the liquid deep-freezing medium before the used batteries are comminuted in the comminuting device.

6. The plant of claim 5, wherein a gas head space of the deep-freezing device is connected to the at least one supply line for supplying the inert gas to the gas head space.

7. The plant of claim 1, further comprising a sieve unit arranged at an outlet of the comminuting device.

8. The plant of claim 1, further comprising a cooling device assigned to the intermediate storage device.

9. The plant of claim 1, wherein the drying device is a negative-pressure drying device and comprises a pressure control unit to set and maintain a pressure in the drying space.

10. The plant of claim 1, wherein the drying device comprises a temperature control unit to set and maintain a temperature in the drying space.

11. The plant of claim 1, further comprising a filling device is arranged downstream of the comminuting device.

12. The plant of claim 1, further comprising at least one screening device arranged downstream of the comminuting device.

13. The plant of claim 1, wherein a volume of the intermediate storage space of the intermediate storage device is at least five times a volume of the comminuting space of the comminuting device.

14. The plant of claim 1, wherein a volume of the intermediate storage space of the intermediate storage device is at least ten times a volume of the comminuting space of the comminuting device.

15. The plant of claim 7, wherein the sieve unit comprises a perforated sieve.

16. The plant of claim 9, wherein maintaining the pressure comprises maintaining the pressure at a value below an ambient pressure.

17. The plant of claim 16, wherein the value below the ambient pressure comprises a value of about fifty hecto pascals (50 hPa) below the ambient pressure.

18. The plant of claim 10, wherein the maintaining the temperature in the drying space comprises maintaining the temperature in the drying space at a value of at least one hundred twenty degrees Celsius (120° C.).

19. The plant of claim 11, further comprising at least one screening device arranged upstream of the filling device and downstream of the comminuting device.

* * * * *